Nov. 14, 1939.  A. J. DARDEL  2,180,036

AIRSHIP AND PROCESS FOR SUSTAINING THE SAME

Filed June 8, 1938

INVENTOR:
AIMÉ JOSEPH DARDEL
By: Alfred Müller
ATTORNEY.

Patented Nov. 14, 1939

2,180,036

UNITED STATES PATENT OFFICE 2,180,036

AIRSHIP AND PROCESS FOR SUSTAINING THE SAME

Aimé Joseph Dardel, Moncey, Doubs, France

Application June 8, 1938, Serial No. 212,417
In France June 17, 1937

2 Claims. (Cl. 244—97)

This invention relates to aircraft of the lighter-than-air type, and has for its general object to provide an aircraft of this type with simple, practical means to control its buoyancy and thereby to facilitate its maneuverability, without loss of its sustaining gas.

With the foregoing and other objects in view, which will become more fully apparent as the nature of the invention is better understood, the same consists in an aircraft of the lighter-than-air type embodying the novel features of construction and the novel combination and arrangement of elements as will be hereinafter more fully described, illustrated in the accompanying drawing and defined in the appended claims.

Figure 1:
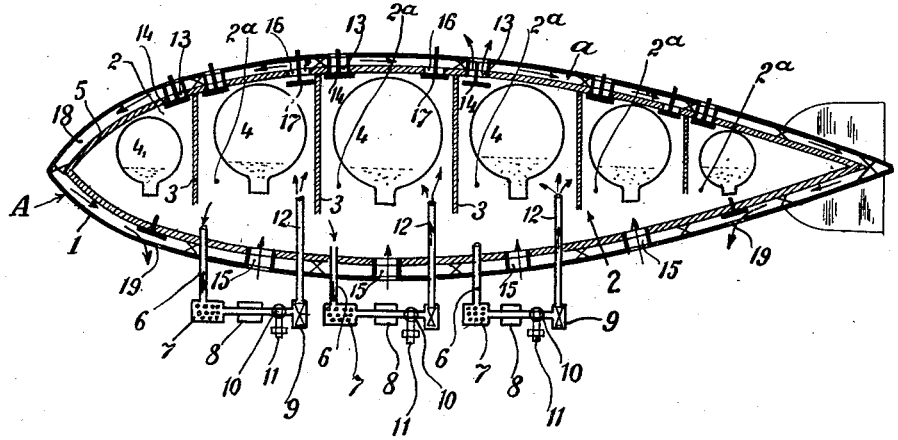
Figure 2:
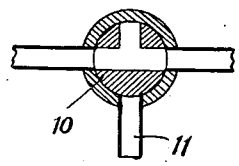
Figure 3:
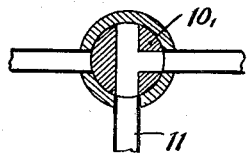

In the accompanying drawing:

Fig. 1 is a central, vertical, longitudinal section through an aircraft constructed in accordance with one practical embodiment of the invention; and Figs. 2 and 3 are enlarged sectional views through one of the air control valves of the aircraft, showing, respectively, different positions of adjustment of said valve.

Referring to the drawing in detail, A designates, generally, the body of an aircraft constructed in accordance with the invention and which may be flexible or rigid and of single or double-walled construction as desired. Preferably, however, it is rigid and of double-walled construction as shown, comprising, for example, a suitable rigid frame, designated as $a$, and suitable outer and inner envelopes designated as 1 and 5, respectively, disposed exteriorly and interiorly of said frame and supported by the latter in spaced apart relationship.

The space 2 enclosed by the inner envelope 5 is divided by suitable partitions 3 into a plurality of compartments 2ª, and in said compartments are suitable bags or balloons 4 which contain a suitable light gas, such as hydrogen or helium, and which, to all intents and purposes, may be regarded as permanently closed.

In the upper part of the inner envelope 5 are openings 16 affording communication between the space 2 and the space 18 between the envelopes 1 and 5 under the control of suitable valves 17, which may be operated in any suitable manner, while in the lower part of the outer envelope 1 are openings 19 affording communication between the space 18 and the atmosphere.

Other openings in the upper parts of the envelopes 1 and 5 are connected together by tubes 13, which, under the control of associated, suitably operable valves 14, control communication between the top of said space 2 and the atmosphere. On the other hand, openings in the lower parts of the envelopes 1 and 5 are connected together by tubes which may or may not be valve-controlled as desired and which afford communication between the bottom of the space 2 and the atmosphere.

Suitably mounted upon the aircraft body A, preferably at the bottom thereof, is one or more devices for supplying warm or cool air to the space 2. Each such device comprises a heat exchange chamber 7 having an air outlet pipe 6 leading thereto from the space 2 and an air supply pipe 12 leading therefrom to said chamber 2. In the air supply pipe 12 is a suitable valve 10, which may be operated in any suitable manner either to establish communication between the chamber 7 and the space 2 and to deny communication between the atmosphere and said space 2, or to deny communication between said chamber 7 and said space 2 and to establish communication between said space 2 and the atmosphere through a branch 11 of the pipe 12.

Associated with the air supply pipe 12 between the valve 10 and the chamber 7 is a suitable means for heating air passing through said pipe, while interposed in said pipe 12 between the valve 10 and the space 2 is a suitable fan or blower 9 for effecting a forced flow of air through said pipe 12 to said space 2.

Extending through the chamber 7 are tubes or the like for connection with the exhaust conduit of the aircraft engine, so as to utilize the heat of the exhaust gases of the engine to heat air passing through said chamber 7.

When the fan or blower 9 is in operation and the valve 10 is in the position shown in Fig. 2 establishing communication between the chamber 7 and the space 2 through the pipe 12, air is circulated through the space 2 and the chamber 7. If, under such condition, hot exhaust gases from the engine heat the air passing through the chamber 7, or if the heating means 8 is in operation, warm air is delivered to the space 2 and rises therein and cooler air is withdrawn from said space. Warming the air in the space 2 serves of itself to increase the buoyancy of the aircraft, but primarily warming of the air in the space 2 has the effect of expanding the light gas in the bags or balloons 4 and in this way very materially increasing the buoyancy of the aircraft. In this connection, the engine exhaust gases and also the heating means 8 may be utilized to effect a rapid rise in temperature of the air in the space 2 when it is desired to effect a rapid ascent of the aircraft. On the other hand, when a desired elevation of the aircraft has been attained, the heating means 8 may be cut out and reliance may be placed on engine exhaust gases alone to supply the heat required to maintain the air in the space 2 at the proper temperature to maintain the elevation of the aircraft. On the other hand, when descent of the aircraft is desired, the valve 10 may be operated to the position shown in Fig. 3 to cause cool air to be supplied to the space 2 and warm air may be exhausted from said space 2 through the tubes 13 by opening the valves 14. Obviously, the rate of descent and ascent of the aircraft may be regulated or controlled by regulation of the valves 10 and 14.

The openings 15 provide for equalization of pressure between the space 2 and the atmosphere, and the valve-controlled openings 16 provide for the regulated supply of warm or cool air to the space 18 either to suppress or promote the collection of condensate or frost on the envelope 1, depending upon whether it is desired to avoid condensate or frost to render the aircraft more buoyant, or to utilize the weight of condensate or frost to assist in effecting descent of the aircraft. Of course, the space 18 serves to insulate the space 2 from the atmosphere and thereby assists in enabling rapid changes in temperature of the air within the space 2 to be effected.

Without further description it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:
1. A lighter-than-air aircraft comprising an inner envelope enclosing an air space, an outer envelope spaced from and enclosing said inner envelope, closed bags within the inner envelope containing light gas, air circulating means in closed circuit with the inner envelope-enclosed space, means for varying the temperature of air circulated through said means and said space, and valve means for controlling communication between said space and the space between said envelopes.

2. A lighter-than-air aircraft comprising an inner envelope enclosing an air space, closed bags within said space containing light gas, means for varying the temperature of the air within said space, an outer envelope spaced from and enclosing said inner envelope, and valve means controlling communication between the interior of said inner envelope and the space between said envelopes.

AIMÉ JOSEPH DARDEL.